(12) United States Patent
Veiga et al.

(10) Patent No.: US 11,763,477 B2
(45) Date of Patent: Sep. 19, 2023

(54) PERSON HEIGHT ESTIMATION

(71) Applicant: Apple Inc., Cupertino, CA (US)

(72) Inventors: Alexandre Da Veiga, San Francisco, CA (US); George J. Hito, Sunnyvale, CA (US); Timothy R. Pease, Emerald Hills, CA (US)

(73) Assignee: Apple Inc., Cupertino, CA (US)

( * ) Notice: Subject to any disclaimer, the term of this patent is extended or adjusted under 35 U.S.C. 154(b) by 200 days.

(21) Appl. No.: 17/182,344

(22) Filed: Feb. 23, 2021

(65) Prior Publication Data

US 2021/0295548 A1 Sep. 23, 2021

Related U.S. Application Data

(60) Provisional application No. 62/990,589, filed on Mar. 17, 2020.

(51) Int. Cl.
*G06T 7/60* (2017.01)
*G06T 7/73* (2017.01)

(52) U.S. Cl.
CPC .................. *G06T 7/60* (2013.01); *G06T 7/73* (2017.01); *G06T 2207/10028* (2013.01); *G06T 2207/30201* (2013.01)

(58) Field of Classification Search
CPC ... G06T 7/60; G06T 7/73; G06T 2207/10028; G06T 2207/30201
See application file for complete search history.

(56) References Cited

U.S. PATENT DOCUMENTS

| 7,301,547 | B2 | 11/2007 | Martins et al. | |
| 8,411,149 | B2 * | 4/2013 | Maison | A63F 13/06 348/207.1 |
| 9,805,505 | B2 | 10/2017 | Datta et al. | |
| 10,853,663 | B1 * | 12/2020 | Mirza | G06K 9/6274 |
| 2011/0299776 | A1 * | 12/2011 | Lee | G06V 40/171 382/173 |

(Continued)

FOREIGN PATENT DOCUMENTS

WO  WO-2021163373 A1 *  8/2021  ........... G02B 27/017

OTHER PUBLICATIONS

Liu Y, Sowmya A, Khamis H (2018) "Single camera multi-view anthropometric measurement of human height and mid-upper arm circumference using linear regression". Plos One 13 (4):e0195600. https://doi.org/10.1371/journal.pone.0195600 (Year: 2017).*

(Continued)

*Primary Examiner* — Shefali D Goradia
(74) *Attorney, Agent, or Firm* — Thompson Hine LLP

(57) ABSTRACT

Various implementations disclosed herein include devices, systems, and methods that determines a distance between a portion (e.g., top) of a person's head and the floor below as an estimate of the person's height. For example, an example process may include determining a first position on a head of a person in a three-dimensional (3D) coordinate system, the first position determined based on detecting a feature on the head based on a two-dimensional (2D) image of the person in a physical environment, determining a second position on a floor below the first position in the 3D coordinate system, and estimating a height based on determining a distance between the first position and the second position.

18 Claims, 7 Drawing Sheets

(56) References Cited

U.S. PATENT DOCUMENTS

2014/0286540 A1  9/2014  Hatzilias et al.

OTHER PUBLICATIONS

Zhao, Tao, Ramakant Nevatia, and Fengjun Lv. "Segmentation and tracking of multiple humans in complex situations." Proceedings of the 2001 IEEE Computer Society Conference on Computer Vision and Pattern Recognition. CVPR 2001. vol. 2. IEEE, 2001, (2001).*
Momeni-K, Mahdi; Diamantas, Sotirios Ch.; Ruggiero, Fabio and Sicilian, Bruno; "Height Estimation From a Single Camera View"; Proceedings of the International Conference on Computer Vision Theory and Applications (VISAPP-2012); pp. 358-364; 2012.

\* cited by examiner

PERSON HEIGHT ESTIMATION

CROSS-REFERENCE TO RELATED APPLICATIONS

This application claims the benefit of U.S. Provisional Application Ser. No. 62/990,589 filed Mar. 17, 2020, which is incorporated herein in its entirety.

TECHNICAL FIELD

The present disclosure generally relates to the field of mobile devices, and in particular, to systems, methods, and devices that determine height measurements of people or objects based on information detected in physical environments.

BACKGROUND

Detection of a person in a physical environment and accurate height measurements of that person can play an important role in generating accurate reconstructions and for providing height information to a user on a mobile device. There are numerous hurdles to providing computer-based systems to automatically and accurately generate person height measurements based on sensor data. The sensor data obtained regarding a physical environment (e.g., light intensity images) may be incomplete or insufficient to provide accurate measurements. As another example, images typically lack depth and semantic information, and measurements generated without such data may lack accuracy. Existing techniques do not allow for automatic, accurate, and efficient generation of person height measurements using a mobile device, for example, based on a user acquiring photos or video or other sensor data. Moreover, existing techniques may fail to provide sufficiently accurate and efficient measurements in real time environments (e.g., immediate measurement during scanning).

SUMMARY

Various implementations disclosed herein include devices, systems, and methods that determine a distance between a portion (e.g., top) of a person's head and the floor below as an estimate of the person's height. The portion (e.g., top) of the person's head is determined based on detecting a feature (e.g., a face) on the head based on a two-dimensional (2D) image. For example, this may involve identifying the portion of a mask (e.g., semantic segmentation mask) based on the location of the person's face. Depth data may be used to identify a boundary of the head in the mask even where the mask does not indicate a boundary, e.g., where another person is standing behind the user's head. Depth data may be used to determine the three-dimensional (3D) location of the floor even if the portion of the floor that is below the top of the head is not in the image data. It may be desirable to display the height of a person in a live camera view. It may be desirable to determine and store the height of a person, for example, in metadata associated with the image. The information could then be used to track a person's height as the person grows (e.g., tracking and recording a child's growth over time).

In some implementations, excluding objects from a model is facilitated using segmentation. For example, a segmentation technique (e.g., a machine learning model) may be used to generate a segmentation mask identifying objects of a particular type (e.g., person, animal, etc.). The segmentation mask may indicate pixel locations in a corresponding RGB image using values 0 or 1 to indicate whether the pixel locations correspond to an object to be included in the data or an object to be excluded from the data. A segmentation technique may be used to semantically label the objects within a physical environment using confidence levels. The measurement data may then be determined based on a mask of the image (e.g., segmentation masks identifying objects that are determined to be included in the data, such as a person).

Some implementations of this disclosure involve an exemplary method of determining a distance between a portion of a person's head and the floor below as an estimate of the person's height. The exemplary method involves, at a device having a processor, determining a first position (e.g., top) on a head of a person in a 3D coordinate system, the first position determined based on detecting a feature (e.g., face) on the head based on a 2D image of the person in a physical environment. In some implementations, this may involve obtaining a mask identifying 2D coordinates corresponding to one or more people. For example, a semantic segmentation mask may be utilized that is based on 2D RGB and/or depth images. This may involve detecting a feature on the person's head and identifying the first position as a position within the mask based on the feature. For example, finding the center of the face and moving upward to find the top of the head within the mask.

The exemplary method further involves determining a second position on a floor below the first position in the 3D coordinate system. In some implementations, this may involve determining a floor plane using RGB data and/or depth sensor data. Additionally, or alternatively, the floor plane may be determined using machine learning to classify a plane as the floor (e.g., classifying each data point based on a detected height). In some implementations, the floor plane may be determined over time using a 3D model that is updated using data from multiple instances.

The exemplary method further involves estimating a height based on determining a distance between the first position and the second position. For example, the first position for a top of head and a second position on the floor may each have corresponding 3D coordinates that a system can use to determine the height. In some implementations, estimating a person's height may involve using multiple height estimates obtained over time, discarding outliers, or other means for averaging several data points of measurement data acquired over time.

In some implementations, determining the first position includes obtaining a mask identifying portions of an image corresponding to one or more people, detecting a feature on the head of the person (or of each person if multiple people), and identifying the first position within a portion of the mask corresponding to one or more people based on the detected feature(s) on the head of each respective person identified. For example, a semantic segmentation mask may be utilized that is based on 2D RGB images, depth images, or a combination of both RGB and depth images. In some implementations, identifying the first position within a portion of the mask may include finding the center of the face and moving upward to find the top of the head within the mask.

In some implementations, the feature that is detected on the head is a face. For example, a "face" may be defined as a portion of a head that includes one or more of, but necessarily all of, eyes, nose, mouth, cheeks, ears, chin, and the like. In some implementations, identifying the first position within the portion of the mask includes determining a center of the face and an orientation of the face, and identifying a portion of the mask in a direction (e.g., upward in a center of nose to center of forehead direction) from the center of the face, wherein the direction is based on the orientation. In some implementations, identifying the first position within the portion of the mask further includes generating a bounding box (e.g., a 2D box for the face that can be projected to individual points on the head into 3D space) corresponding to the face. For example, the bounding box may provide location, pose (e.g., orientation and location), and shape of detected feature of a person (e.g., the face of a person). In some implementations, the bounding box is a 3D bounding box. Alternatively, the bounding box is a 2D box that can be projected to individual points on the head into 3D space as a 3D bounding box.

In some implementations, identifying the first position within the portion of the mask includes identifying a boundary of the head based on data from a depth sensor. For example, identifying a boundary of a head of a person can include determining the sides (e.g., ears), a bottom (e.g., chin), and a top of a head (e.g., top of forehead, or top position on a head). In some implementations, the person may be slouching or the head may be tilted, and the system would use the top most point of the person for the height estimation. For example, if a person had his or her head angled to the side such as leaning on his or her shoulder, the ear may be the top most point to take the height estimation. In some implementations, the system could determine the person is slouching or tilting their head, and use that in consideration when calculating the person's overall height by making an adjustment based on determining that the person is not standing up straight. In some implementations, the height estimation is based on a measurement from a top of a person's head to a floor below their feet. Alternatively, if a person is raising his or her hand above his or her head, the system could determine a height estimation from the top of the person's hand to the floor plane, or to another determined plane. In some implementations, the height estimation could automatically determine if a person in the image was holding out both hands and desired to have his or her wingspan automatically calculated. The height estimation system could then detect a feature of each hand to determine an estimated wingspan of the identified person.

In some implementations, determining the second position on the floor includes determining a floor plane based on image data acquired from a camera on the device. For example, this may involve determining a floor plane using RGB data and/or depth sensor data. In some implementations, the image data includes depth data that includes multiple depth points, and determining the floor plane based on the image data includes classifying a portion of the depth points as the floor plane based on a determined height of each of the depth points, and determining the second position on the floor based on the determined height of each of the depth points corresponding to the floor plane. For example, the floor plane may be determined using machine learning to classify a determined plane as the floor.

In some implementations, the image data includes a plurality of image frames acquired over a period of time, and determining the floor plane based on the image data includes generating a 3D model based on the image data that includes the floor plane, and iteratively updating the 3D model for each acquired frame of the plurality of image frames. For example, during a live video feed, multiple images are acquired over time, and the person height estimation system described herein can iteratively update the height estimation for one or more frames of the video feed to determine an accurate portrayal of the person's height. Each iteration should provide a more accurate height determination.

In some implementations, the image data includes the entire picture of the person from the head to the feet, where the feet are in contact with the floor in the image data. For example, a full person shot that shows the entire person. Alternatively, the height estimation system could determine a height estimation without having to see the entire person, using the top of the head and determining and extending the floor plane. For example, from a different perspective (e.g., from an elevated view such as from a drone, or a person standing on a second floor looking down or on a ladder, or the like) a person of whom it is desired to calculate the height may not be entirely in the image. The person may be shown from the waist up, even though they are standing, but a floor is seen in the image data behind that person. The height estimation system described herein can still determine the z height location of the 3D coordinates of the floor as the second position, and determine the z height location of the 3D coordinates of the top of the head and determine an estimated height of the person based on the difference in z height of the two positions.

In some implementations, estimating the height based on determining the distance between the first position and the second position includes determining a plurality of distance estimates between the first position and the second position, identifying a subset of the plurality of distance estimates using an averaging technique, (e.g., calculate average, remove outliers), and determining the distance between the first position and the second position based on the subset of data.

In some implementations, the person is a first person and the 2D image includes the first person and a second person, wherein determining the first position on the head of the first person is based on determining that the first person is closer to a center of the 2D image than compared to the second person with respect to the center of the 2D image. For example, multiple people may be included in the image data, and the person height estimation system described herein can decipher which person to calculate the height for based on a center of the reticle of the camera or the center of the image that the user is focusing on with the camera of the device. In some implementations, the person height estimation system described herein can estimate the height of each detected person in the image data.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
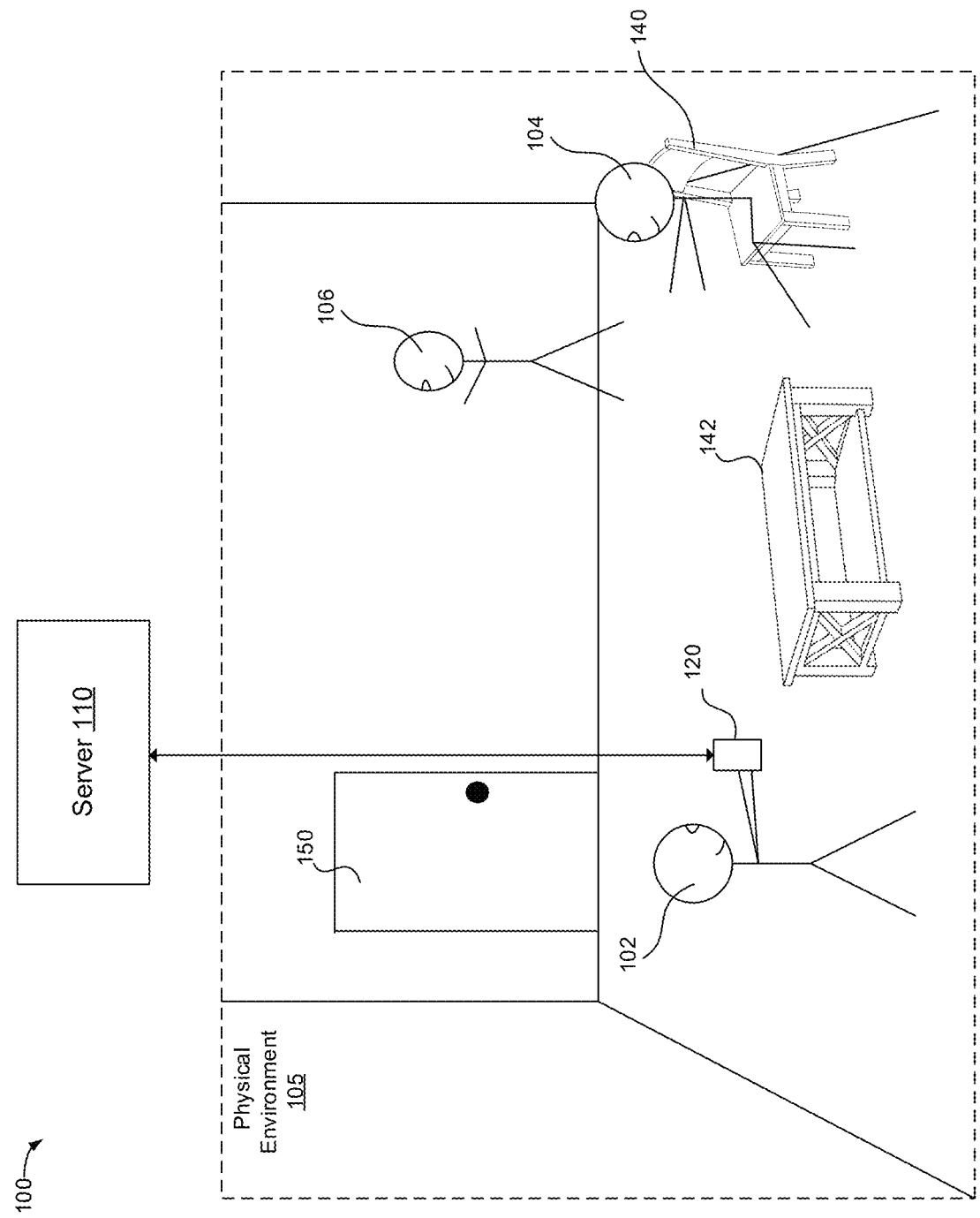
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 is a block diagram of an example operating environment 100 in accordance with some implementations. In this example, the example operating environment 100 illustrates an example physical environment 105 that includes a chair 140, table 142, door 150. Additionally, the example operating environment 100 includes a person (e.g., user 102) holding a device (e.g., device 120), a person (e.g., object/person 104) sitting on the chair 140, and a person (e.g., object/person 106) standing in the physical environment 105. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a server 110 and a device 120. In an exemplary implementation, the operating environment 100 does not include a server 110, and the methods described herein are performed on the device 120.

In some implementations, the server 110 is configured to manage and coordinate an experience for the user. In some implementations, the server 110 includes a suitable combination of software, firmware, and/or hardware. The server 110 is described in greater detail below with respect to FIG. 2. In some implementations, the server 110 is a computing device that is local or remote relative to the physical environment 105. In one example, the server 110 is a local server located within the physical environment 105. In another example, the server 110 is a remote server located outside of the physical environment 105 (e.g., a cloud server, central server, etc.). In some implementations, the server 110 is communicatively coupled with the device 120 via one or more wired or wireless communication channels (e.g., BLUETOOTH, IEEE 802.11x, IEEE 802.16x, IEEE 802.3x, etc.).

In some implementations, the device 120 is configured to present an environment to the user. In some implementations, the device 120 includes a suitable combination of software, firmware, and/or hardware. The device 120 is described in greater detail below with respect to FIG. 3. In some implementations, the functionalities of the server 110 are provided by and/or combined with the device 120.

In some implementations, the device 120 is a handheld electronic device (e.g., a smartphone or a tablet) configured to present content to the user. In some implementations, the user 102 wears the device 120 on his/her head. As such, the device 120 may include one or more displays provided to display content. For example, the device 120 may enclose the field-of-view of the user 102. In some implementations, the device 120 is replaced with a chamber, enclosure, or room configured to present content in which the user 102 does not wear or hold the device 120.

Figure 2:
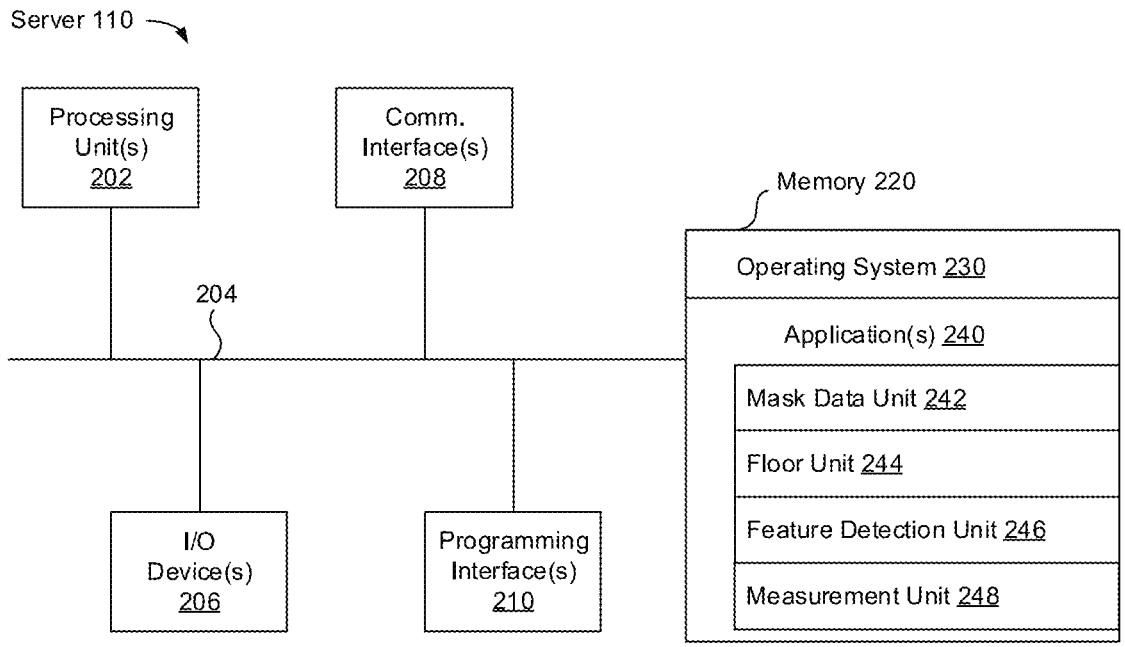
FIG. 2 is a block diagram of an example server in accordance with some implementations.

FIG. 2 is a block diagram of an example of the server 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the server 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and one or more applications 240.

The operating system 230 includes procedures for handling various basic system services and for performing hardware dependent tasks. In some implementations, the applications 240 are configured to manage and coordinate one or more experiences for one or more users (e.g., a single experience for one or more users, or multiple experiences for respective groups of one or more users).

The applications 240 include a mask data unit 242, a floor unit 244, a feature detection unit 246, and a measurement unit 248. The mask data unit 242, the floor unit 244, the feature detection unit 246, and the measurement unit 248 can be combined into a single application or unit or separated into one or more additional applications or units.

The mask data unit 242 is configured with instructions executable by a processor to acquire image data (e.g., light intensity data, depth data, camera position information, etc.) and generate a mask (e.g., a segmentation mask) identifying portions of an image associated with an object (e.g., a person) based on the image data using one or more techniques disclosed herein. For example, the mask data unit 242 acquires light intensity data (e.g., RGB data 503) from the light intensity camera 502 and depth data 505 from the depth camera 504, and generates a segmentation mask for all identified people (e.g., identifies all locations of identified people for three-dimensional (3D) data to provide to the feature detection unit 246 and the measurement unit 248). In some implementations the mask data unit 242 acquires segmentation data (e.g., RGB-S) from a segmentation unit and generates a segmentation mask based on the segmentation data. Alternatively, the mask data unit 242 generates a segmentation mask based directly on the obtained depth data (e.g., a depth camera on the device 120).

The floor unit 244 is configured with instructions executable by a processor to acquire image data (e.g., light intensity data, depth data, camera position information, etc.) and generate floor data of the physical environment using one or more of the techniques disclosed herein. For example, the floor unit 244 acquires a sequence of light intensity images (e.g., RGB data) from a light intensity camera (e.g., a live camera feed) and depth data from the depth camera, and generates floor data (e.g., identifies a floor plane or a lowest point on a floor with respect to the person or persons identified in the image data) to provide to the measurement unit 248. In some implementations, the floor unit 244 determines a floor plane based on segmentation data that identifies the floor. Alternatively, the floor unit 244 determines a floor plane based on a machine learning unit that is trained to identify floor points in the depth data, and classify the floor points based on the lowest points identified in the 3D coordinate system. In some implementations, the determined floor plane is iteratively updated during a live camera feed for improved accuracy using one or more of the techniques disclosed herein.

The feature detection unit 246 is configured with instructions executable by a processor to acquire image data (e.g., light intensity data, depth data, camera position information, etc.) and mask data (e.g., a segmentation mask) identifying portions of an image associated with an object (e.g., a person) and determine a position (e.g., top) on a head of a person based on the image data and the mask data using one or more techniques disclosed herein. For example, the feature detection unit 246 acquires a sequence of light intensity images (e.g., RGB data) from a light intensity camera (e.g., a live camera feed), depth data from the depth camera, and mask data from the mask data unit 242, and determines a position (e.g., a 3D coordinate) on a head of a person based on the image data and the mask data using one or more techniques disclosed hereinto provide to the measurement unit 248. In some implementations, the feature detection unit 246 determines the top of the head of a person by detecting one or more features of a person's head, such as a face, finding the center of the face and moving upward to find the top of the head within the mask. For example, a "face" may be defined as a portion of a head that includes one or more of, but necessarily all of, eyes, nose, mouth, cheeks, ears, chin, and the like. In some implementations, identifying the first position within the portion of the mask includes determining a center of the face and an orientation of the face, and identifying a portion of the mask in a direction (e.g., upward in a center of nose to center of forehead direction) from the center of the face, wherein the direction is based on the orientation. In some implementations, identifying the first position within the portion of the mask further includes generating a bounding box corresponding to the face. For example, the bounding box may provide location, pose (e.g., orientation and location), and shape of detected feature of a person (e.g., the face of a person). In some implementations, the bounding box is a 3D bounding box. Alternatively, the bounding box is a 2D box that can be projected to individual points on the head into 3D space as a 3D bounding box. In some implementations, the feature detection unit 246 determines the top of the head based on viewing at least some portion of the front of the face. Alternatively, the feature detection unit 246 determines the top of the head based on viewing only the back of the head and based on a feature of the head that can be viewed from the back of the head (e.g., the ears).

The measurement unit 248 is configured with instructions executable by a processor to acquire image data (e.g., light intensity data, depth data, camera position information, etc.), mask data, floor data, and feature detection data, and determine a distance between a portion of a person's head and the floor below as an estimate of the person's height using one or more techniques disclosed herein. For example, the measurement unit 248 acquires a sequence of light intensity images (e.g., RGB data) from a light intensity camera (e.g., a live camera feed), depth data from the depth camera, obtains mask data from the mask data unit 242, obtains floor data from the floor unit 244, obtains feature detection data (e.g., top of the head data) from the feature detection unit 246, and determines an estimated height for a person identified by the mask data. For example, the first position for a top of head and a second position on the floor may each have corresponding 3D coordinates that a system can determine the height or distance between those two coordinates in the specific direction and axis of the coordinate system. In some implementations, estimating a person's height may involve using multiple distance estimates obtained over time, discarding outliers, or other means for averaging several data points of measurement data acquired over time.

Although these elements are shown as residing on a single device (e.g., the server 110), it should be understood that in other implementations, any combination of the elements may be located in separate computing devices. Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
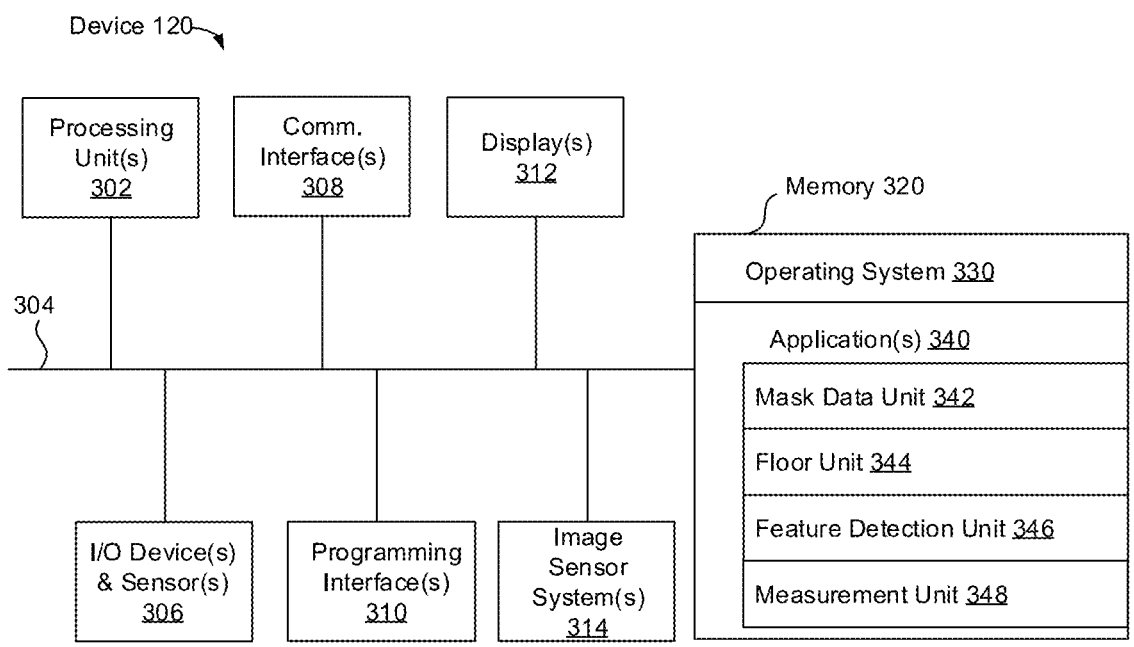
FIG. 3 is a block diagram of an example device in accordance with some implementations.

FIG. 3 is a block diagram of an example of the device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 310, one or more AR/VR displays 312, one or more interior and/or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 312 are configured to present the experience to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the device 120 includes a single display. In another example, the device 120 includes an display for each eye of the user.

In some implementations, the one or more image sensor systems 314 are configured to obtain image data that corresponds to at least a portion of the physical environment 105. For example, the one or more image sensor systems 314 include one or more RGB cameras (e.g., with a complimentary metal-oxide-semiconductor (CMOS) image sensor or a charge-coupled device (CCD) image sensor), monochrome cameras, IR cameras, event-based cameras, and/or the like. In various implementations, the one or more image sensor systems 314 further include illumination sources that emit light, such as a flash. In various implementations, the one or more image sensor systems 314 further include an on-camera image signal processor (ISP) configured to execute a plurality of processing operations on the image data including at least a portion of the processes and techniques described herein.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and one or more applications 340.

The operating system 330 includes procedures for handling various basic system services and for performing hardware dependent tasks. In some implementations, the applications 340 are configured to manage and coordinate one or more experiences for one or more users (e.g., a single experience for one or more users, or multiple experiences for respective groups of one or more users).

The applications 340 include a mask data unit 342, a floor unit 344, a feature detection unit 346, and a measurement unit 348. The mask data unit 342, the floor unit 344, the feature detection unit 346, and the measurement unit 348 can be combined into a single application or unit or separated into one or more additional applications or units.

The mask data unit 342 is configured with instructions executable by a processor to acquire image data (e.g., light intensity data, depth data, camera position information, etc.) and generate a mask (e.g., a segmentation mask) identifying portions of an image associated with an object (e.g., a person) based on the image data using one or more techniques disclosed herein. For example, the mask data unit 342 acquires light intensity data (e.g., RGB data) from the light intensity camera and depth data from the depth camera, and generates a segmentation mask for all identified people (e.g., identifies all locations of identified people for the 3D data to provide to the feature detection unit 346 and the measurement unit 348). In some implementations the mask data unit 342 acquires segmentation data (e.g., RGB-S) from a segmentation unit and generates a segmentation mask based on the segmentation data. Alternatively, the mask data unit 342 generates a segmentation mask based directly on the obtained depth data (e.g., a depth camera on the device 120).

The floor unit 344 is configured with instructions executable by a processor to acquire image data (e.g., light intensity data, depth data, camera position information, etc.) and generate floor data of the physical environment using one or more of the techniques disclosed herein. For example, the floor unit 344 acquires a sequence of light intensity images (e.g., RGB data) from a light intensity camera (e.g., a live camera feed) and depth data from the depth camera, and generates floor data (e.g., identifies a floor plane or a lowest point on a floor with respect to the person or persons identified in the image data) to provide to the measurement unit 348. In some implementations, the floor unit 344 determines a floor plane based on segmentation data that identifies the floor. Alternatively, the floor unit 344 determines a floor plane based on a machine learning unit that is trained to identify floor points in the depth data, and classify the floor points based on the lowest points identified in the 3D coordinate system. In some implementations, the determined floor plane is iteratively updated during a live camera feed for improved accuracy using one or more of the techniques disclosed herein.

The feature detection unit 346 is configured with instructions executable by a processor to acquire image data (e.g., light intensity data, depth data, camera position information, etc.) and mask data (e.g., a segmentation mask) identifying portions of an image associated with an object (e.g., a person) and determine a position (e.g., top) on a head of a person based on the image data and the mask data using one or more techniques disclosed herein. For example, the feature detection unit 346 acquires a sequence of light intensity images (e.g., RGB data) from a light intensity camera (e.g., a live camera feed), depth data from the depth camera, and mask data from the mask data unit 342, and determines a position (e.g., a 3D coordinate) on a head of a person based on the image data and the mask data using one or more techniques disclosed hereinto provide to the measurement unit 348. In some implementations, the feature detection unit 346 determines the top of the head of a person by detecting one or more features of a person's head, such as a face, finding the center of the face and moving upward to find the top of the head within the mask. For example, a "face" may be defined as a portion of a head that includes one or more of, but necessarily all of, eyes, nose, mouth, cheeks, ears, chin, and the like. In some implementations, identifying the first position within the portion of the mask includes determining a center of the face and an orientation of the face, and identifying a portion of the mask in a direction (e.g., upward in a center of nose to center of forehead direction) from the center of the face, wherein the direction is based on the orientation. In some implementations, identifying the first position within the portion of the mask further includes generating a 3D bounding box corresponding to the face. For example, the 3D bounding box may provide location, pose (e.g., orientation and location), and shape of detected feature of a person (e.g., the face of a person). In some implementations, the feature detection unit 346 determines the top of the head based on viewing at least some portion of the front of the face. Alternatively, the feature detection unit 346 determines the top of the head based on viewing only the back of the head but based on a feature of the head that can be viewed from the back of the head (e.g., the ears).

The measurement unit 348 is configured with instructions executable by a processor to obtain acquire image data (e.g., light intensity data, depth data, camera position information, etc.), mask data, floor data, and feature detection data, and determine a distance between a portion of a person's head and the floor below as an estimate of the person's height using one or more techniques disclosed herein. For example, the measurement unit 348 acquires a sequence of light intensity images (e.g., RGB data) from a light intensity camera (e.g., a live camera feed), depth data from the depth camera, obtains mask data from the mask data unit 342, obtains floor data from the floor unit 344, obtains feature detection data (e.g., top of the head data) from the feature detection unit 346, and determines an estimated height for a person identified by the mask data. For example, the first position for a top of head and a second position on the floor may each have corresponding 3D coordinates that a system can determine the height or distance between those two coordinates in the specific direction and axis of the coordinate system. In some implementations, estimating a person's height may involve using multiple distance estimates obtained over time, discarding outliers, or other means for averaging several data points of measurement data acquired over time.

Although these elements are shown as residing on a single device (e.g., the device 120), it should be understood that in other implementations, any combination of the elements may be located in separate computing devices. Moreover, FIG. 3 is intended more as functional description of the various features which are present in a particular implementation as opposed to a structural schematic of the implementations described herein. As recognized by those of ordinary skill in the art, items shown separately could be combined and some items could be separated. For example, some functional modules (e.g., applications 340) shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
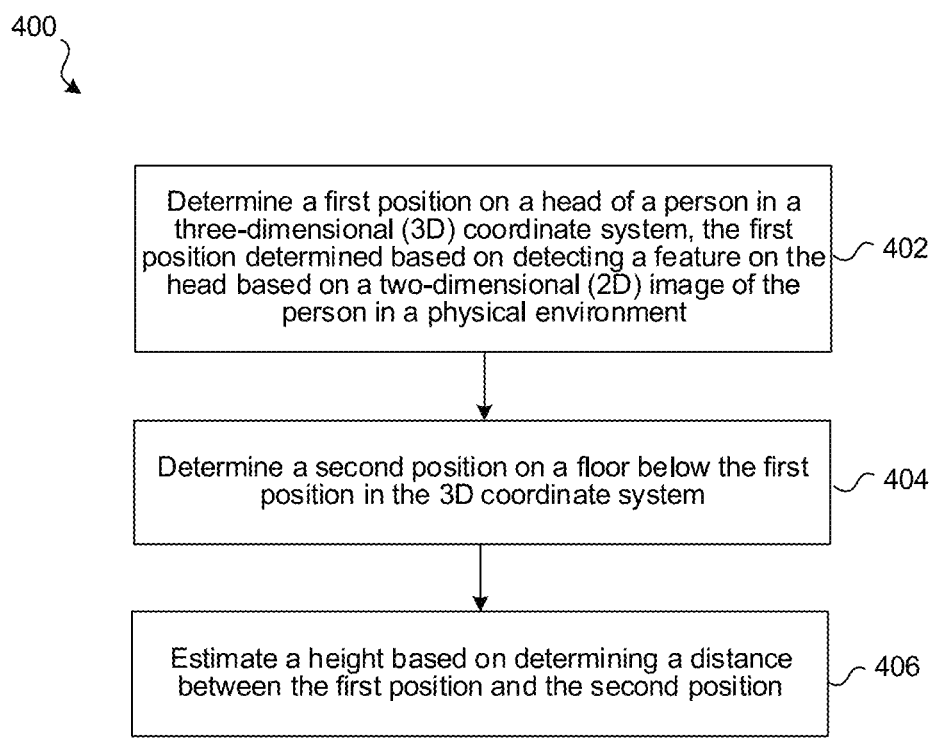
FIG. 4 is a flowchart representation of an exemplary method that determines a distance between a portion of a person's head and the floor below as an estimate of the person's height in accordance with some implementations.

FIG. 4 is a flowchart representation of an exemplary method 400 that determines a distance between a portion (e.g., top) of a person's head and the floor below as an estimate of the person's height in accordance with some implementations. In some implementations, the method 400 is performed by a device (e.g., server 110 or device 120 of FIGS. 1-3), such as a mobile device, desktop, laptop, or server device. The method 400 can be performed on a device (e.g., device 120 of FIGS. 1 and 3) that has a screen for displaying images and/or a screen for viewing stereoscopic images such as a head-mounted display (HMD). In some implementations, the method 400 is performed by processing logic, including hardware, firmware, software, or a combination thereof. In some implementations, the method 400 is performed by a processor executing code stored in a non-transitory computer-readable medium (e.g., a memory). The person height estimation process of method 400 is illustrated with reference to FIGS. 5A-5F.

At block 402, the method 400 determines a first position (e.g., top) on a head of a person in a 3D coordinate system, the first position determined based on detecting a feature (e.g., face) on the head based on a two-dimensional (2D) image of the person in a physical environment. In some implementations, this may involve obtaining a mask identifying 2D coordinates corresponding to one or more people. For example, a semantic segmentation mask may be utilized that is based on 2D RGB and/or depth images. detecting a feature on the person's head and identify the first position as a position within the mask based on the feature. For example, finding the center of the face and moving upward to find the top of the head within the mask.

In some implementations, determining the first position includes obtaining a mask identifying portions of an image corresponding to one or more people, detecting a feature on the head, and identifying the first position within a portion of the mask corresponding to one or more people based on a feature on the head. For example, a semantic segmentation mask may be utilized that is based on 2D RGB images, depth images, or a combination of both RGB and depth images. In some implementations, identifying the first position within a portion of the mask may include finding the center of the face and moving upward to find the top of the head within the mask.

In some implementations, the feature that is detected on the head is a face. For example, a "face" may be defined as a portion of a head that includes one or more of, but necessarily all of, eyes, nose, mouth, cheeks, ears, chin, and the like. In some implementations, identifying the first position within the portion of the mask includes determining a center of the face and an orientation of the face, and identifying a portion of the mask in a direction (e.g., upward in a center of nose to center of forehead direction) from the center of the face, wherein the direction is based on the orientation. In some implementations, identifying the first position within the portion of the mask further includes generating a bounding box corresponding to the face. For example, the bounding box may provide location, pose (e.g., orientation and location), and shape of detected feature of a person (e.g., the face of a person). In some implementations, the bounding box is a 3D bounding box. Alternatively, the bounding box is a 2D box that can be projected to individual points on the head into 3D space as a 3D bounding box. In some implementations, the process 400 determines the top of the head based on viewing at least some portion of the front of the face. Additionally, in some implementations, the process 400 determines the top of the head based on viewing only the back of the head and based on a feature of the head that can be viewed from the back of the head (e.g., the ears).

In some implementations, identifying the first position within the portion of the mask includes identifying a boundary of the head based on data from a depth sensor. For example, identifying a boundary of a head of a person can include determining the sides (e.g., ears), a bottom (e.g., chin), and a top of a head (e.g., top of forehead, or top position on a head). In some implementations, the person may be slouched or the head may be tilted, and the system would use the top most point of the person for the height estimation. For example, if a person had their head on the side such as leaning on their shoulder, the ear may be the top most point to take the height estimation. In some implementations, the system could determine the person is slouching or tilting their head and use that in consideration when calculating the person's overall height by making an adjustment based on determining that the person is not standing up straight. In some implementations, the height estimation is based on a measurement from a top of a person's head to a floor below their feet. Alternatively, if a person is raising their hand above their head, the system could determine a height estimation from the top of the person's hand to the floor plane, or to another determined plane. In some implementations, the height estimation could automatically determine if a person in the image was holding out both hands and desired to have their wingspan automatically calculated. The height estimation system could then detect a feature of each hand to determine an estimated wingspan of the identified person.

At block 404, the method 400 determines a second position on a floor below the first position in the 3D coordinate system. In some implementations, this may involve determining a floor plane using RGB data and/or depth sensor data. Additionally, or alternatively, the floor plane may be determined using machine learning to classify a plane as the floor (e.g., classifying each data point based on a detected height). In some implementations, the floor plane may be determined over time using a 3D model that is updated using data from multiple instances.

In some implementations, determining the second position on the floor includes determining a floor plane based on image data acquired from a camera on the device. For example, determining a floor plane using RGB data and/or depth sensor data. In some implementations, the image data includes depth data that includes a plurality of depth points, wherein determining the floor plane based on the image data includes classifying a portion of the plurality of depth points as the floor plane based on a determined height of each of the depth points, and determining the second position on the floor based on the determined height of each of the depth points corresponding to the floor plane. For example, the floor plane may be determined using machine learning to classify a plane as the floor.

At block 406, the method 400 estimates a height based on determining a distance between the first position and the second position. For example, the first position for a top of head and a second position on the floor may each have corresponding 3D coordinates that a system can determine the height or distance between those two coordinates in the specific direction and/or axis (e.g., x-, y-, or z-axis) of the coordinate system. In some implementations, estimating a person's height may involve using multiple distance estimates obtained over time, discarding outliers, or other means for averaging several data points of measurement data acquired over time.

In some implementations, the image data includes a plurality of image frames acquired over a period of time, and determining the floor plane based on the image data includes generating a 3D model based on the image data that includes the floor plane, and iteratively updating the 3D model for each acquired frame of the plurality of image frames. For example, during a live video feed, multiple images are acquired over time, and the person height estimation system described herein can iteratively update the height estimation for one or more frames of the video feed to determine an accurate portrayal of the person's height. Each iteration should provide a more accurate height determination.

In some implementations, estimating the height based on determining the distance between the first position and the second position includes determining a plurality of distance estimates between the first position and the second position, identifying a subset of the plurality of distance estimates using an averaging technique, (e.g., calculate average, remove outliers, and the like), and determining the distance between the first position and the second position based on the subset of data. For example, a running average of height estimation can be made over time as the image data (e.g., RGB and depth data) is acquired. The running average could be based on continuously updating the top of the head determination, continuously updating the floor plane determination, or both.

In some implementations, the person is a first person and the 2D image includes the first person and a second person, wherein determining the first position on the head of the first person is based on determining that the first person is closer to a center of the 2D image than compared to the second person with respect to the center of the 2D image. For example, multiple people may be included in the image data, and the person height estimation system described herein can decipher which person to calculate the height for based on a center of the reticle of the camera or the center of the image that the user is focusing on with the camera of the device. In some implementations, the person height estimation system described herein can estimate the height of each detected person in the image data. In some implementations, the person height estimation system described herein can wait for some user interaction with the person in the image on a screen of the user device. For example, a user may be viewing a live video of a group of people and tap on the person of interest to determine a height estimation.

In some implementations, the person height estimation system described herein could acquire a single frame of a 2D light intensity image (e.g., a single RGB image such as a photograph), extrapolate depth data from the 2D image, and determine an estimation of a person's height based on the 2D image and depth data. For example, if tracking a height of a child over time is desired, the system could acquire several photos of the child (e.g., scan or take pictures from a photo album of the child) and have the person height estimation system described herein determine an estimated height for each photograph. Additionally, if the photos are digital, the person height estimation system described herein could store the height data within the metadata of the digitally stored image.

In use, for the process 400, a user (e.g., user 102 in FIG. 1) may acquire images of a person (or multiple people) in a room with a device (e.g., a smartphone such as device 120) and the processes described herein would acquire image data, identify people within the environment, and determine an estimate of the person's height (or for each person for multiple people) as a person is being scanned by the camera on the device. In some implementations, the estimation of the person's height may be automatically displayed and updated on the user device overlaid during a live camera feed. In some implementations, the estimation of the person's height may be provided after some type of user interaction after scanning the physical environment. For example, the user may be shown options of identified people, and the user may select or click on the person that the user wants the measurement information, and measurement information would then be displayed. Thus, as shown and discussed below with reference to FIGS. 5A-5F, a height estimation unit 520 determines a distance between a portion of a person's head and the floor below as an estimate of the person's height by determining segmentation mask data (e.g., 2D mask of a person) with a mask data unit 530 (e.g., mask data unit 242 of FIG. 2, and/or mask data unit 342 of FIG. 3), determining floor plane data with a floor unit 540 (e.g., floor unit 244 of FIG. 2, and/or floor unit 344 of FIG. 3), detecting feature's on person's head with a feature detection unit 550 (e.g., feature detection unit 246 of FIG. 2, and/or feature detection unit 346 of FIG. 3), and determining a distance between a top of a head of a person and the floor plane by a measurement unit 560 (e.g., measurement unit 248 of FIG. 2, and/or measurement unit 348 of FIG. 3).

FIGS. 5A-5F are system flow diagrams of example environments 500A-500F, respectively, in which a system can determine a distance between a portion of a person's head and the floor below as an estimate of the person's height using depth and light intensity image information detected in the physical environment. In some implementations, the system flow of the example environments 500A-500F is performed on a device (e.g., server 110 or device 120 of FIGS. 1-3), such as a mobile device, desktop, laptop, or server device. The system flow of the example environments 500A-500F can be displayed on a device (e.g., device 120 of FIGS. 1 and 3) that has a screen for displaying images and/or a screen for viewing stereoscopic images such as a head-mounted display (HMD). In some implementations, the system flow of the example environments 500A-500F is performed on processing logic, including hardware, firmware, software, or a combination thereof. In some implementations, the system flow of the example environments 500A-500F is performed on a processor executing code stored in a non-transitory computer-readable medium (e.g., a memory).

Figure 5A:
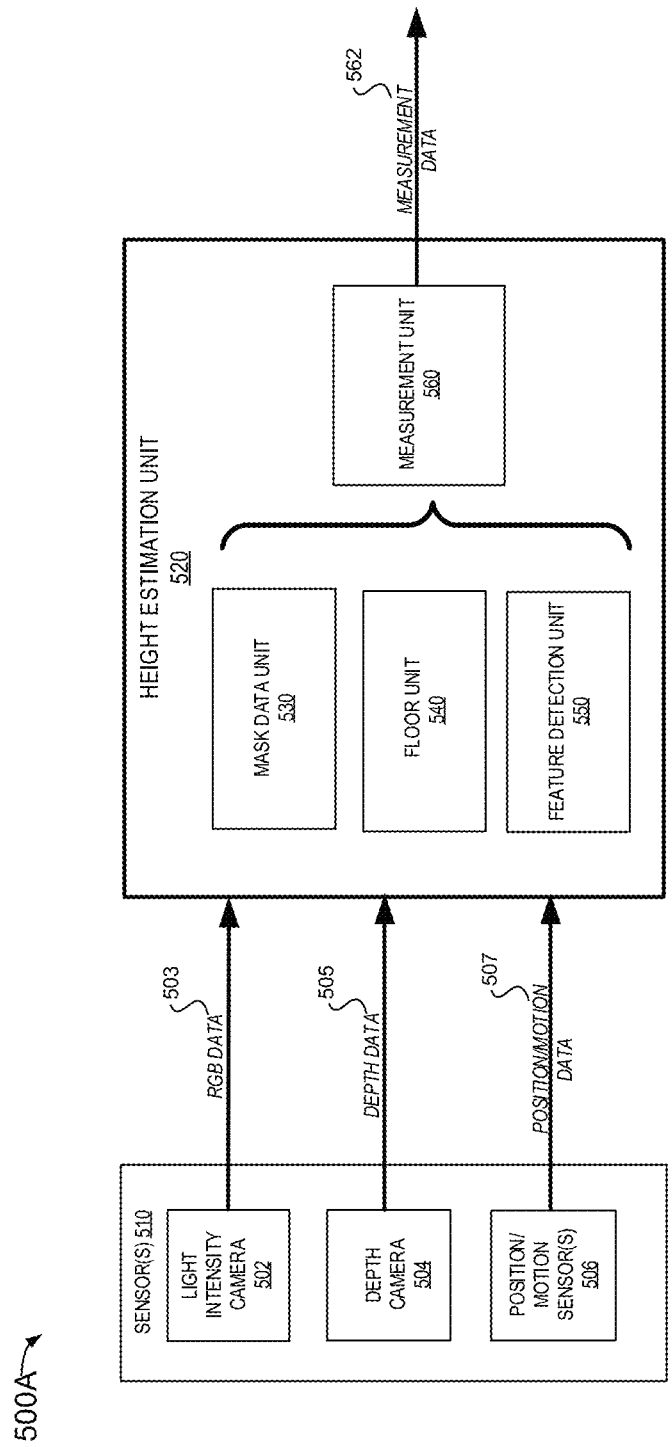
FIGS. 5A-F are block diagrams illustrating an example system flow of determining a distance between a portion of a person's head and the floor below as an estimate of the person's height in accordance with some implementations.

FIG. 5A is a block diagram of an example environment 500A in which a height estimation unit 520 can determine a distance between a portion of a person's head and the floor below as an estimate of the person's height using light intensity image information and depth information detected in the physical environment. The system flow of the example environment 500A acquires light intensity image data 503 (e.g., live camera feed from light intensity camera 502), depth image data 505 (e.g., depth image data from depth camera 504), and other sources of physical environment information (e.g., camera positioning information 507 from position sensors 506) of a physical environment (e.g., the physical environment 105 of FIG. 1), and determines a distance between a portion of a person's head and the floor below as an estimate of the person's height by determining segmentation mask data (e.g., 2D mask of a person) with a mask data unit 530 (e.g., mask data unit 242 of FIG. 2, and/or mask data unit 342 of FIG. 3), determines floor plane data with a floor unit 540 (e.g., floor unit 244 of FIG. 2, and/or floor unit 344 of FIG. 3), detects feature's on person's head with a feature detection unit 550 (e.g., feature detection unit 246 of FIG. 2, and/or feature detection unit 346 of FIG. 3), and determines a distance between a top of a head of a person and the floor plane by a measurement unit 560 (e.g., measurement unit 248 of FIG. 2, and/or measurement unit 348 of FIG. 3).

The measurement unit 560 is configured with instructions executable by a processor to acquire image data (e.g., light intensity data, depth data, camera position information, etc.), mask data, floor data, and feature detection data, and determine a distance between a portion of a person's head and the floor below as an estimate of the person's height using one or more techniques disclosed herein. For example, the measurement unit 560 (e.g., measurement unit 248 of FIG. 2, and/or measurement unit 348 of FIG. 3) acquires a sequence of light intensity images (e.g., RGB data 503) from a light intensity camera 502 (e.g., a live camera feed), depth data 505 from the depth camera 504, obtains mask data from the mask data unit 530, obtains floor data from the floor unit 540, obtains feature detection data (e.g., top of the head data) from the feature detection unit 550, and determines an estimated height for a person identified by the mask data. For example, the first position for a top of head and a second position on the floor may each have corresponding 3D coordinates that a system can determine the height or distance between those two coordinates in the specific direction and axis of the coordinate system. In some implementations, estimating a person's height may involve using multiple distance estimates obtained over time, discarding outliers, or other means for averaging several data points of measurement data acquired over time.

In an example implementation, the environment 500A includes an image composition pipeline that acquires or obtains data (e.g., image data from image source(s)) for the physical environment. Example environment 500A is an example of acquiring image data (e.g., light intensity data and depth data) for a plurality of image frames. The image source(s) may include a depth camera 504 that acquires depth data 505 of the physical environment, and a light intensity camera 502 (e.g., RGB camera) that acquires light intensity image data 503 (e.g., a sequence of RGB image frames). For the positioning information, some implementations include a visual inertial odometry (VIO) system to determine equivalent odometry information using sequential camera images (e.g., light intensity data 503) to estimate the distance traveled. Alternatively, some implementations of the present disclosure may include a SLAM system (e.g., position sensors 506). The SLAM system may include a multidimensional (e.g., 3D) laser scanning and range measuring system that is GPS-independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location.

Figure 5B:
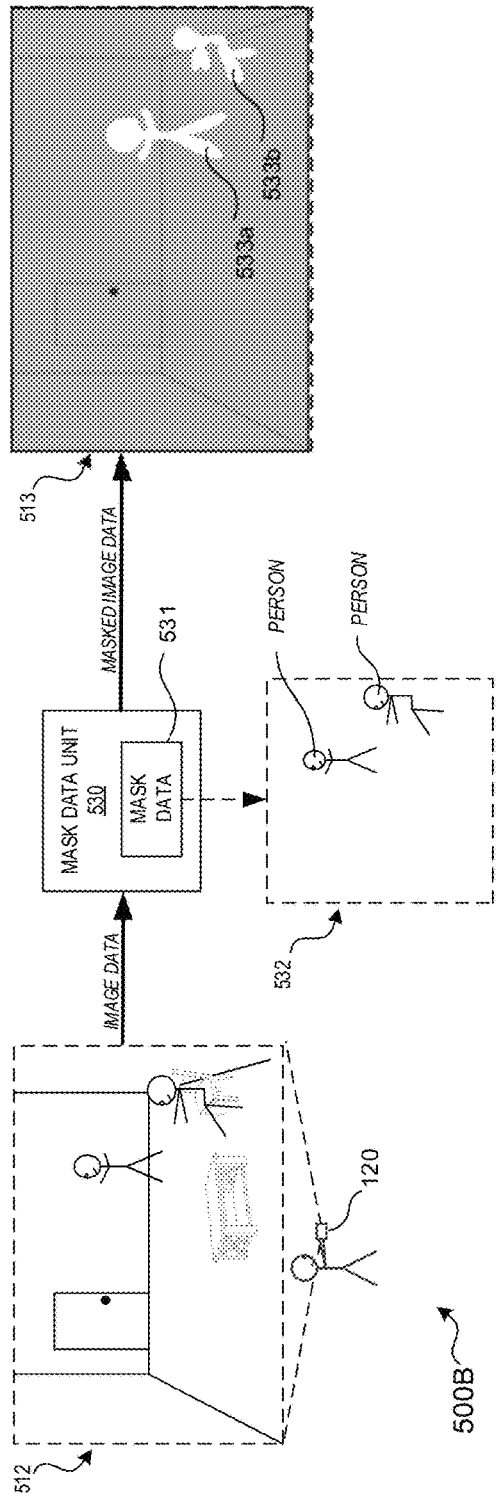

FIG. 5B is a block diagram of an example environment 500B in which a mask data unit 530 (e.g., mask data unit 242 of FIG. 2, and/or mask data unit 342 of FIG. 3) can generate masked data 531 (e.g., a segmentation mask) using acquired image data 512 (e.g., depth data such as a 3D point cloud, RGB data, and the like) and/or acquired semantic segmentation data (e.g., RGB-S data that semantically labels objects and/or people within the image data). In particular, environment 500B is acquiring image 512 (e.g., image data from physical environment 105 of FIG. 1 where user 102 is acquiring image data that includes object/person 104 and object/person 106). The masked data 532 represents the objects (e.g., people) that are to be masked, meaning only the identified objects (e.g., the people) are shown and the remaining information is masked out. For example, the masked image data 513 shows the determined mask data that includes mask 533a (e.g., object/person 104) and mask 533b (e.g., object/person 106). The mask data unit 530 can send the masked image information to the feature detection unit (e.g., feature detection unit 246 of FIG. 2, and/or feature detection unit 346 of FIG. 3). Alternatively, the mask data unit 530 can send the identified pixel locations of the identified objects/persons to a feature detection unit, and the feature detection unit can then determine whether or not to include or exclude the identified objects/persons (e.g., based on confidence values).

In some implementations, the mask data unit 530 uses a machine learning model, where a segmentation mask model may be configured to identify semantic labels for pixels or voxels of image data. A segmentation mask machine learning model may generate the segmentation mask identifying objects of a particular type (e.g., person, cat) associated with motion (e.g., people frequently move, while furniture does not). In some implementations, the mask may indicate objects using values 0 or 1 to indicate whether the information should be included in the 3D model or not (e.g., motion objects). In some implementations, the segmentation machine learning model may be a neural network executed by a neural engine/circuits on the processor chip tuned to accelerate AI software. In some implementations, the segmentation mask may include confidence values at the pixel level. For example, a pixel location may be labeled as 0.8 chair, thus, the system is 80% confident that the x,y,z coordinates for that pixel location is a chair. As additional data is obtained, the confidence level may be adjusted. In some implementations, the machine learning model is a neural network (e.g., an artificial neural network), decision tree, support vector machine, Bayesian network, or the like.

Figure 5C:
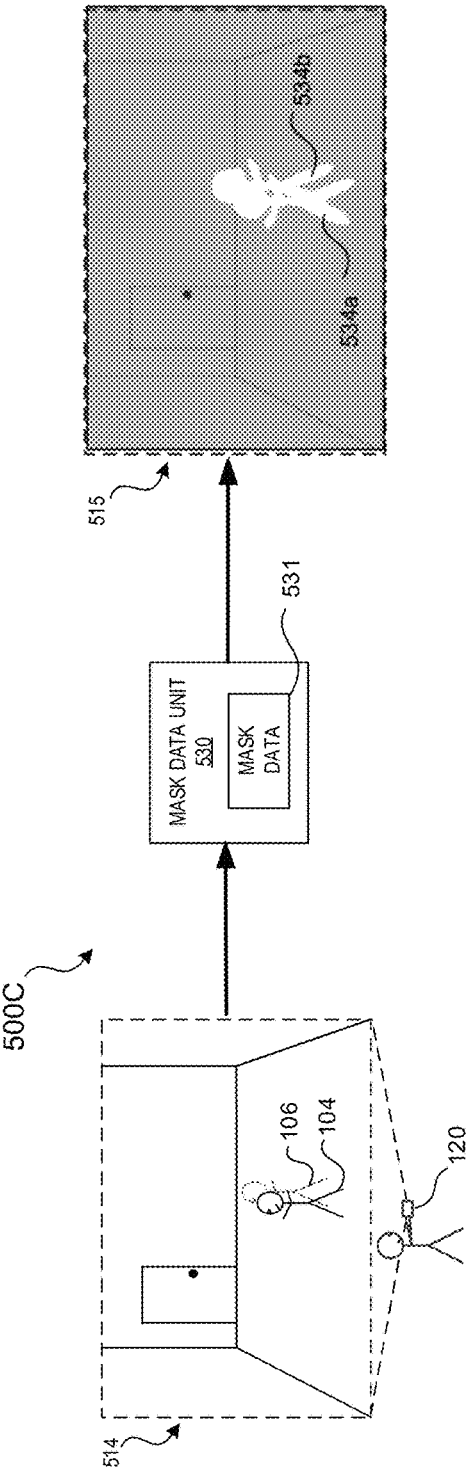

FIG. 5C is a block diagram of an example environment 500C in which a mask data unit 530 (e.g., mask data unit 242 of FIG. 2, and/or mask data unit 342 of FIG. 3) can generate masked data 531 using obtained image data 514 (e.g., depth data such as a 3D point cloud, RGB data, and the like) and/or obtained semantic segmentation data (e.g., RGB-S data that semantically labels objects and/or people within the image data). In particular, environment 500C is an example of acquiring image 514 (e.g., image data from physical environment 105 of FIG. 1). However, image 514 is different than image 512 in environment 500B, because user 102 is acquiring image data that includes object/person 104 and object/person 106, but object/person 106 is standing behind and being partially blocked by object/person 104. The masked data 531 represents the objects (e.g., people) that are to be masked, meaning only the identified objects (e.g., the people) are shown and the remaining information is masked out. For example, the masked image data 515 shows the determined mask data that includes mask 534a (e.g., object/person 104) and mask 534b (e.g., object/person 106). In some implementations, using the techniques described herein, the feature detection unit can decipher between mask 534a and 534b, even though they overlap, based on the detecting a feature on the person's head for mask 534a, such as features on the face. The mask data unit 530 can send the masked image information to the feature detection unit (e.g., feature detection unit 246 of FIG. 2, and/or feature detection unit 346 of FIG. 3). Alternatively, the mask data unit 530 can send the identified pixel locations of the identified objects/persons to a feature detection unit, and the feature detection unit can then determine whether or not to include or exclude the identified objects/persons (e.g., based on confidence values).

Figure 5D:
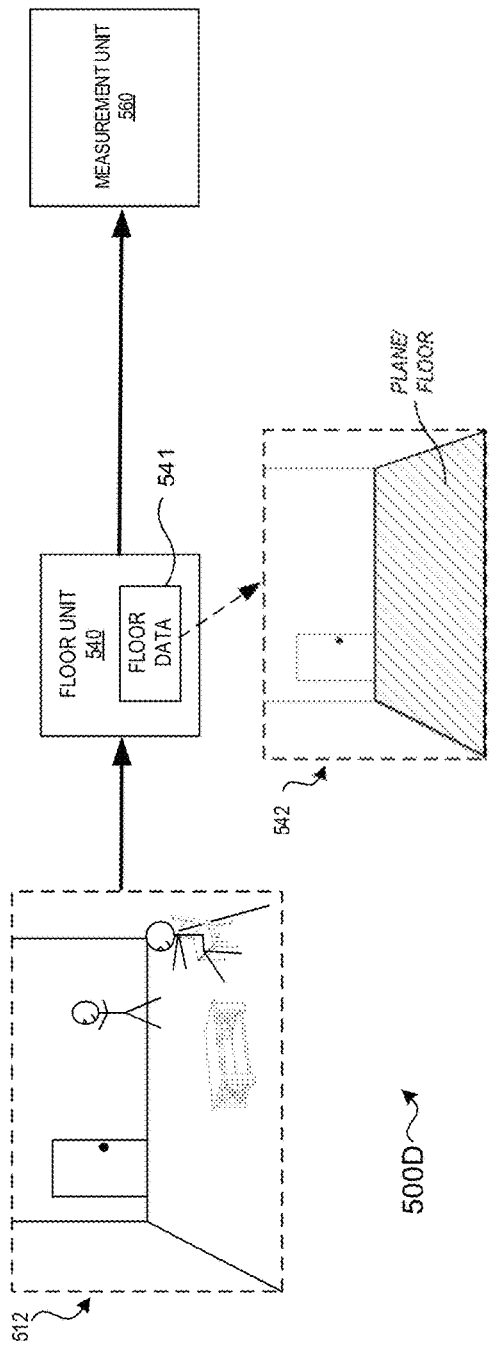

FIG. 5D is a block diagram of an example environment 500D in which a floor unit 540 (e.g., floor unit 244 of FIG. 2, and/or floor unit 344 of FIG. 3) can generate floor data 531 (e.g., a 3D floor plane or the like) using acquired image data 512 (e.g., depth data such as a 3D point cloud, RGB data, and the like) and/or acquired semantic segmentation data (e.g., RGB-S data that semantically labels features, such as the floor, within the image data). In particular, environment 500D is acquiring image 512 (e.g., image data from physical environment 105 of FIG. 1 where user 102 is acquiring image data that includes object/person 104 and object/person 106). The floor data 542 represents the identified floor plane using techniques described herein. The floor unit 530 can send the floor plane information to the measurement unit 560 to use as the second position of a 3D coordinate system when estimating a person's height with respect to the top of the person's head and the determined floor or floor plane.

Figure 5E:
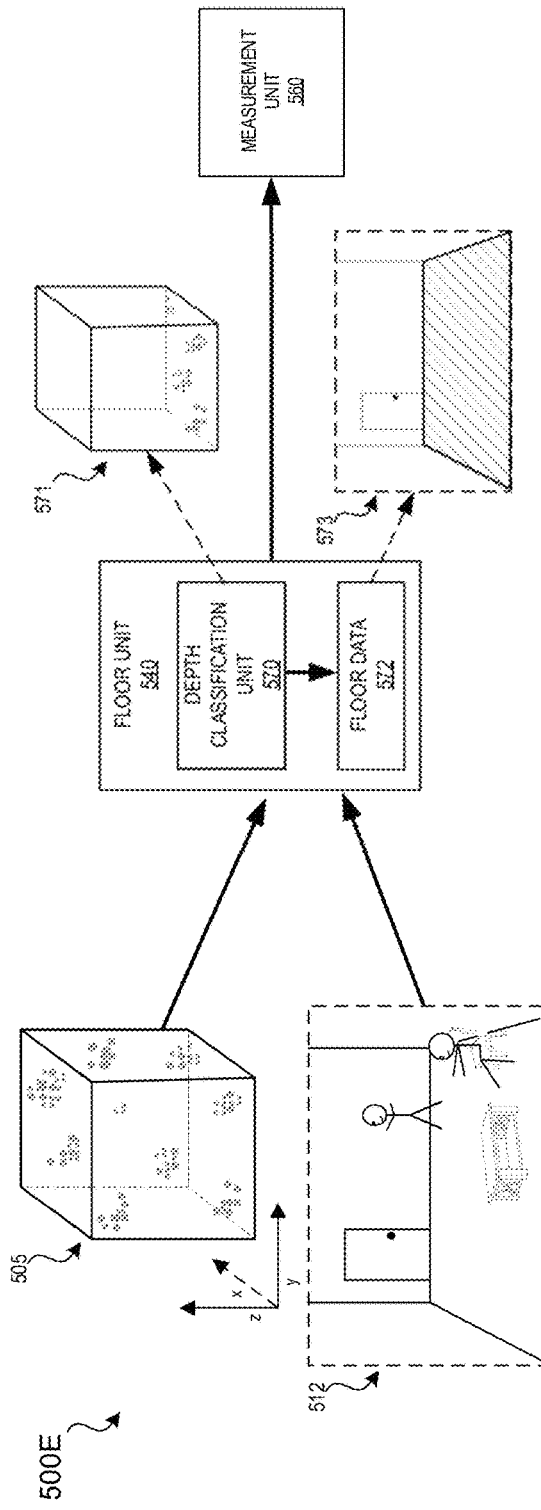

FIG. 5E is a block diagram of an example environment 500E in which a floor unit 540 (e.g., floor unit 244 of FIG. 2, and/or floor unit 344 of FIG. 3) can generate floor data 572 (e.g., a 3D floor plane 573 or the like) using acquired image data 512 (e.g., depth data such as a 3D point cloud 505, RGB data, and the like) and/or acquired semantic segmentation data (e.g., RGB-S data that semantically labels features, such as the floor, within the image data). In particular, environment 500E is acquiring image 512 (e.g., image data from physical environment 105 of FIG. 1 where user 102 is acquiring image data that includes object/person 104 and object/person 106) and a 3D point cloud 505 for the depth data. The floor data 572 represents the identified floor plane using techniques described herein. For example, the floor unit 540 determines a floor plane 573 using a depth classification unit 570 based on machine learning that is trained to identify floor points in the depth data as shown in the 3D point cloud 571. The depth classification unit classifies the floor points based on the lowest points identified in the 3D coordinate system. The floor unit 540 can send the floor plane information 573 to the measurement unit 560 to use as the second position of a 3D coordinate system when estimating a person's height with respect to the top of the person's head and the determined floor or floor plane.

Figure 5F:
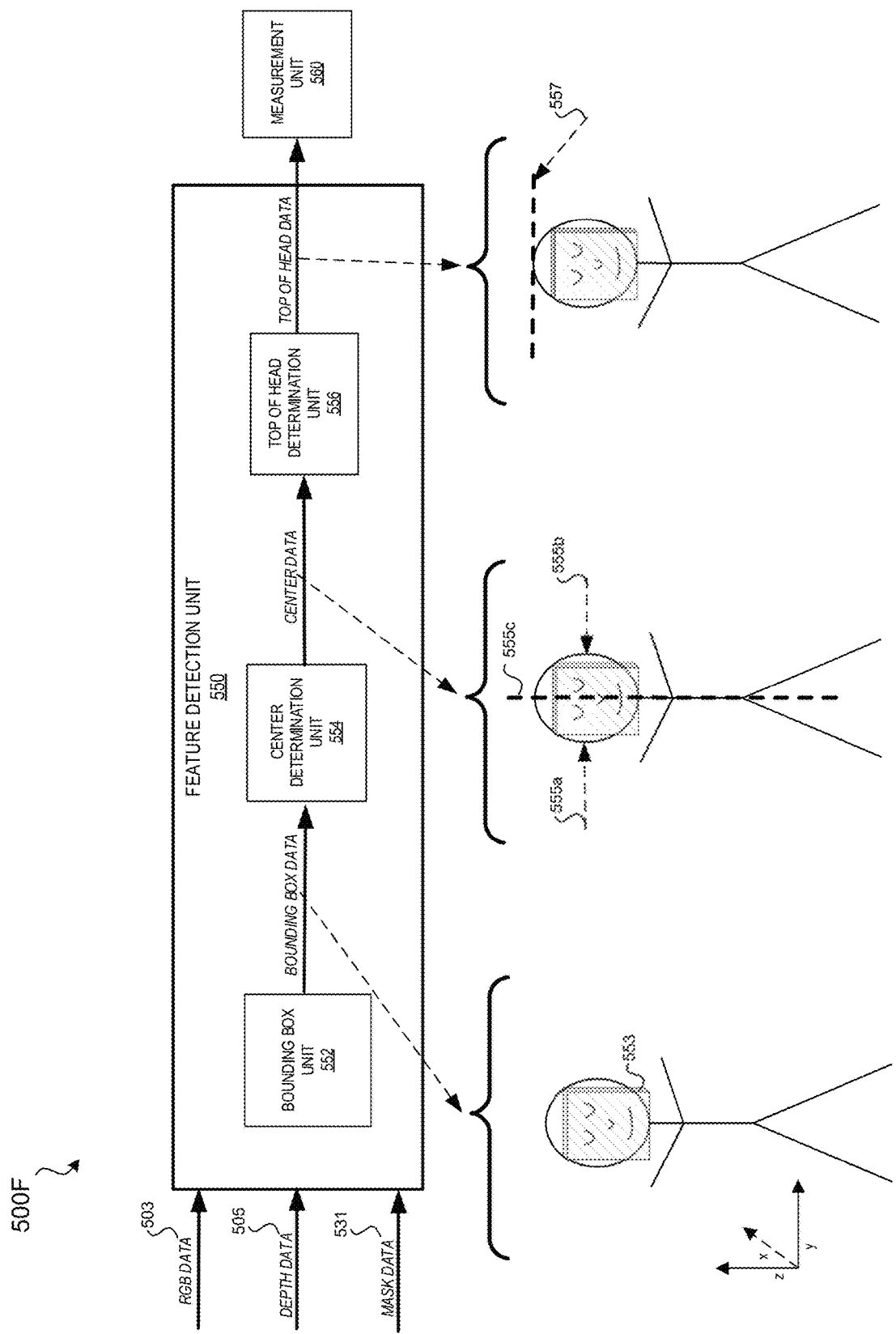

FIG. 5F is a block diagram of an example environment 500F in which a feature detection unit 550 (e.g., feature detection unit 246 of FIG. 2, and/or feature detection unit 346 of FIG. 3) can send information relating to the top of a head of a person to a measurement unit using acquired image data (e.g., light intensity data 503, depth data 505) and acquired mask data 531 from the mask data unit 530. In particular, environment 500F is acquiring image 512 (e.g., image data from physical environment 105 of FIG. 1 where user 102 is acquiring image data) and mask image data 513 that includes mask 533a for the object/person 106 who is standing. In an exemplary implementation and for illustration purposes, the feature detection unit 550 includes a bounding box unit 552, a center determination unit 554, and a top of the head determination unit 556. The bounding box unit 552 generates bound box data 553 around detected features of the head. In particular, the bounding box unit 552 detects a feature on a person's head from the masked data (e.g., a person) that masks the image data, and identifies a face based on the detected feature. The center determination unit 554 utilizes the bounding box data 553 and determines the sides of the head (e.g., a first side 555a and a second side 555b). After determining the sides of the person's head, the center determination unit 554 determines a centerline 555c corresponding to the person. The top of the head determination unit 556 utilizes the centerline 555c and then determines top of the head data (e.g., a 3D coordinate) that is sent to the measurement to estimate a person's height.

In some implementations, the example environment 500 includes a 3D representation unit that is configured with instructions executable by a processor to obtain the sensor data (e.g., RGB data 503, depth data 505, etc.) and measurement data 562, and generate 3D representation data with measurements using one or more techniques. For example, the 3D representation unit analyzes RGB images from a light intensity camera 402 with a sparse depth map from a depth camera 404 (e.g., time-of-flight sensor) and other sources of physical environment information (e.g., camera positioning information such as position/motion data 507 from the sensors 506, or a camera's SLAM system, or the like) to generate 3D representation data (e.g., a 3D model representing the physical environment of FIG. 1). In some implementations, the 3D representation data could be 3D representations representing the surfaces in a 3D environment using a 3D point cloud with associated semantic labels. The 3D representations may be 3D bounding boxes for each detected object of interest, such as person 104/106, table 142, and chair 140. In some implementations, the 3D representation data is a 3D reconstruction mesh that is generated using a meshing algorithm based on depth information detected in the physical environment that is integrated (e.g., fused) to recreate the physical environment. A meshing algorithm (e.g., a dual marching cubes meshing algorithm, a poisson meshing algorithm, a tetrahedral meshing algorithm, or the like) can be used to generate a mesh representing a room (e.g., physical environment 105) and/or object(s) within a room (e.g., person 104/106, table 142, chair 140, etc.). In some implementations, for 3D reconstructions using a mesh, to efficiently reduce the amount of memory used in the reconstruction process, a voxel hashing approach is used in which 3D space is divided into voxel blocks, referenced by a hash table using their 3D positions as keys. The voxel blocks are only constructed around object surfaces, thus freeing up memory that would otherwise have been used to store empty space. The voxel hashing approach is also faster than competing approaches at that time, such as octree-based methods. In addition, it supports streaming of data between the GPU, where memory is often limited, and the CPU, where memory is more abundant.

In some implementations, the example environment 500A further includes an integration unit that is configured with instructions executable by a processor to obtain the subset of image data (e.g., light intensity data 403, depth data 405, etc.) and positioning information (e.g., camera pose information from the position/motion sensors 506) and integrate (e.g., fuse) the subset of image data using one or more known techniques. For example, the image integration unit receives a subset of depth image data 505 (e.g., sparse depth data) and a subset of intensity image data 503 (e.g., RGB) from the image sources (e.g., light intensity camera 502 and depth camera 504), and integrates the subset of image data and generates 3D data. The 3D data can include a dense 3D point cloud (e.g., imperfect depth maps and camera poses for a plurality of image frames around the object) that is sent to a 3D representation unit (e.g., a unit that generates 3D models of the image data). The 3D data can also be voxelized.

In some implementations, the example environment 500A further includes a semantic segmentation unit that is configured with instructions executable by a processor to obtain a subset the light intensity image data (e.g., light intensity data 503) and identify and segment wall structures (wall, doors, windows, etc.) and objects (e.g., person, table, teapot, chair, vase, etc.) using one or more known techniques. For example, the segmentation unit receives a subset of intensity image data 503 from the image sources (e.g., light intensity camera 502), and generates segmentation data (e.g., semantic segmentation data such as RGB-S data). In some implementations, a segmentation unit uses a machine learning model, where a semantic segmentation model may be configured to identify semantic labels for pixels or voxels of image data. In some implementations, the machine learning model is a neural network (e.g., an artificial neural network), decision tree, support vector machine, Bayesian network, or the like.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at a device having a processor:
   obtaining a mask that identifies portions of an image corresponding to one or more people;
   detecting a feature on a head of a person based on a two-dimensional (2D) image of the person in a physical environment;
   determining, based on the detected feature and a portion of the mask, a first position on the head of the person in a three-dimensional (3D) coordinate system;
   determining a second position on a floor below the first position in the 3D coordinate system; and
   estimating a height of the person based on determining a distance between the first position and the second position.

2. The method of claim 1, wherein the feature is a face.

3. The method of claim 2, wherein determining the first position on the head of the person within the portion of the mask comprises:
   determining a center of the face and an orientation of the face; and
   identifying a portion of the mask in a direction from the center of the face, wherein the direction is based on the orientation.

4. The method of claim 3, wherein determining the first position on the head of the person within the portion of the mask further comprises generating a bounding box corresponding to the face.

5. The method of claim 1, wherein determining the first position on the head of the person within the portion of the mask comprises identifying a boundary of the head of the person based on data from a depth sensor.

6. The method of claim 1, wherein determining the second position on the floor comprises determining a floor plane based on image data acquired from a camera on the device.

7. The method of claim 6, wherein the image data comprises depth data that includes a plurality of depth points, wherein determining the floor plane based on the image data comprises:
   classifying a portion of the plurality of depth points as the floor plane based on a determined height of each of the depth points; and
   determining the second position on the floor based on the determined height of each of the depth points corresponding to the floor plane.

8. The method of claim 6, wherein the image data comprises a plurality of image frames acquired over a period of time, wherein determining the floor plane based on the image data comprises:
   generating a 3D model based on the image data that includes the floor plane; and
   iteratively updating the 3D model for each acquired frame of the plurality of image frames.

9. The method of claim 1, wherein estimating the height of the person based on determining the distance between the first position and the second position comprises:
   determining a plurality of distance estimates between the first position and the second position;

identifying a subset of data associated with the plurality of distance estimates using an averaging technique; and determining the distance between the first position and the second position based on the subset of data.

10. The method of claim 1, wherein the person is a first person and the 2D image includes the first person and a second person, wherein determining the first position on the head of the first person is based on determining that the first person is closer to a center of the 2D image than compared to the second person with respect to the center of the 2D image.

11. A device comprising:

a non-transitory computer-readable storage medium; and one or more processors coupled to the non-transitory computer-readable storage medium, wherein the non-transitory computer-readable storage medium comprises program instructions that, when executed on the one or more processors, cause the device to perform operations comprising:

obtaining a mask that identifies portions of an image corresponding to one or more people;

detecting a feature on a head of a person based on a two-dimensional (2D) image of the person in a physical environment;

determining, based on the detected feature and a portion of the mask, a first position on the head of the person in a three-dimensional (3D) coordinate system;

determining a second position on a floor below the first position in the 3D coordinate system; and estimating a height of the person based on determining a distance between the first position and the second position.

12. The device of claim 11, wherein the feature is a face.

13. The device of claim 12, wherein determining the first position on the head of the person within the portion of the mask comprises:

determining a center of the face and an orientation of the face; and identifying a portion of the mask in a direction from the center of the face, wherein the direction is based on the orientation.

14. The device of claim 12, wherein determining the first position on the head of the person within the portion of the mask further comprises generating a bounding box corresponding to the face.

15. The device of claim 11, wherein determining the first position on the head of the person within the portion of the mask comprises identifying a boundary of the head of the person based on data from a depth sensor.

16. The device of claim 11, wherein determining the second position on the floor comprises determining a floor plane based on image data acquired from a camera on the device.

17. The device of claim 16, wherein the image data comprises depth data that includes a plurality of depth points, wherein determining the floor plane based on the image data comprises:

classifying a portion of the plurality of depth points as the floor plane based on a determined height of each of the depth points; and determining the second position on the floor based on the determined height of each of the depth points corresponding to the floor plane.

18. A non-transitory computer-readable storage medium, storing computer-executable program instructions on a computer to perform operations comprising:

obtaining a mask that identifies portions of an image corresponding to one or more people;

detecting a feature on a head of a person based on a two-dimensional (2D) image of the person in a physical environment;

determining, based on the detected feature and a portion of the mask, a first position on the head of the person in a three-dimensional (3D) coordinate system;

determining a second position on a floor below the first position in the 3D coordinate system; and estimating a height of the person based on determining a distance between the first position and the second position.

* * * * *